United States Patent [19]

Ratliff et al.

[11] Patent Number: 4,834,787
[45] Date of Patent: May 30, 1989

[54] PHOSPHATE ROCK UTILIZATION

[75] Inventors: Jerome S. Ratliff, Aurora; Ladislav J. Pircon, Oak Brook, both of Ill.

[73] Assignee: Dolores R. Pircon, Oak Brook, Ill.

[21] Appl. No.: 34,275

[22] Filed: Apr. 3, 1987

[51] Int. Cl.$^4$ ............................................. C05B 13/02
[52] U.S. Cl. .......................................... 71/40; 71/43; 71/63; 423/10; 423/63; 423/319; 423/320
[58] Field of Search ................ 71/38, 40, 43; 423/63, 423/10, 319, 320, 321 R

[56] References Cited

U.S. PATENT DOCUMENTS

| | | |
|---|---|---|
| 3,979,199 | 9/1976 | Collins et al. ........................ 71/40 |
| 4,073,634 | 2/1978 | Pircon et al. . |
| 4,168,150 | 9/1979 | Pircon et al. . |
| 4,252,553 | 2/1981 | Pircon et al. . |
| 4,427,640 | 1/1984 | Bowerman et al. .............. 423/63 X |

OTHER PUBLICATIONS

"Phosphorous and its Compounds", vol. II, pp. 1090–1092 and 1095–1097, edited by John R. Van-Wazer, Interscience Publishers, Inc., New York, N.Y. 1961.

Primary Examiner—Ferris H. Lander
Attorney, Agent, or Firm—Thomas W. Speckman

[57] ABSTRACT

A process providing solubilization of phosphate rock by contacting the rock with sulfurous acid in the presence of an oxidizing agent selected from the group consisting of hydrogen peroxide and ozone. Use of sulfurous acid in combination with a substoichiometric amount of hydrogen peroxide significantly enhances the solubilization of phosphate rock.

18 Claims, 2 Drawing Sheets

PHOSPHATE ROCK UTILIZATION

BACKGROUND OF THE INVENTION

1. Field of the Invention

Phosphate fertilizers are very important in the agricultural economy throughout the world. A principal phosphate source for such fertilizers is natural phosphate rock which, in its natural form, is nearly insoluble in water. To utilize phosphate from natural phosphate rock sources, various acidulation processes have been used to solubilize the phosphates. This invention provides for solubilization of phosphate rock by contacting the rock with an aqueous solution of sulfurous acid in the presence of an oxidizing agent of hydrogen peroxide.

2. Description of the Prior Art

Processes for phosphate fertilizer production utilizing sulfur oxides obtained from flue gas of combustion of sulfur containing fossil fuels, such as coal or oil, or sulfur oxides obtained as stack gas effluents from any industrial plant such as chemical, paper, refinery, fertilizer, steel or coke operations, in the production of phosphate fertilizers is known from U.S. Pat. Nos. 4,073,634, 4,168,150, and 4,252,553. These patents and the patents cited therein are incorporated herein by reference for their teachings regrading solubilization of phosphate rock by the use of sulfur oxides. The above cited patents teach that when untreated phosphate rock is used, the sulfur containing acid must be predominately sulfuric acid to obtain the desired high phosphate solubility from the phosphate rock. However, when utilizing sulfur oxides derived from glue gas, it is necessary to further oxidize the sulfur oxides to obtain the necessary amount of sulfuric acid. This problem becomes greater with increased amounts of sulfur in the fuel. U.S. Pat. No. 4,252,553 teaches that thermally pretreated defluorinated fluorapatite has been found to react with a sulfur containing acid which is predominately sulfurous acid formed by the reaction of a sulfur oxide containing gas with water, thus alleviating the necessity for further oxidation to sulfuric acid to obtain high solubilization of phosphate rock.

SUMMARY OF THE INVENTION

The process of this invention provides solubilization of phosphate rock by contacting the rock with sulfurous acid in the presence of an oxidizing agent of hydrogen peroxide. We have unexpectedly found that the use of stoichiometric amounts of sulfurous acid, relative to the calcium-bound available phosphate in the rock, in the presence of a substoichiometric amount of hydrogen peroxide results in solubilization of nearly 100 percent of the phosphate from untreated phosphate rock. We have found, unexpectedly, that use of the same proportions of hydrogen peroxide with sulfuric acid has an inhibiting influence on the solubility of phosphate from untreated phosphate rock. The mechanism of action when using an oxidizing agent of hydrogen peroxide is not fully understood at this time, but appears to be catalytic or highly synergistic in nature, since when under 10 percent of the moles of hydrogen peroxide of the stoichiometric requirement to oxidize sulfurous acid to sulfuric acid are present, over 80 percent of the total phosphate in the rock is solubilized.

It is an object of this invention to provide a process for high solubilization of phosphate from phosphate rock using aqueous solutions of sulfurous acid.

It is another object of this invention to overcome many of the disadvantages of prior processes for production of phosphatic fertilizers.

It is another object of this invention to provide improved phosphate solubilization from thermally pretreated phosphate rock by use of sulfurous acid.

It is yet another object of this invention to provide a process for the production of fertilizer by utilization of sulfurous acid produced from sulfur oxides obtained from burning of sulfur containing natural fuels and roasting of high sulfur containing metals.

BRIEF DESCRIPTION OF THE DRAWING

The above and other objects will become readily apparent by reading of the detailed disclosure and reference to the drawings wherein.

DESCRIPTION OF PREFERRED EMBODIMENTS

Figure 1:
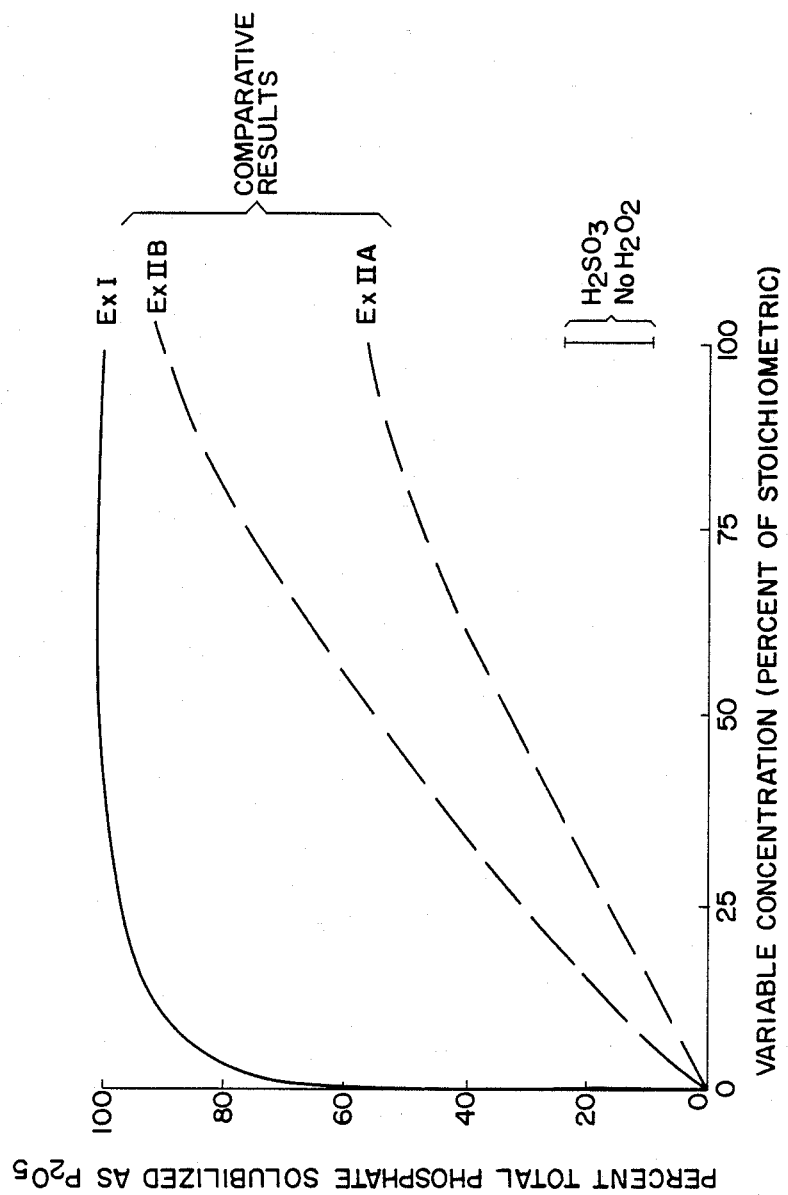
FIG. 1 is a graph showing the percent total phosphate solubilized using sulfurous acid and variable amounts of hydrogen peroxide as described in Example I and comparative results showing inhibition of phosphate solubilization substituting variable amounts of sulfuric acid for sulfurous acid as described in Example II.

The process of this invention may use sulfurous acid derived from any source. Particularly advantageous is use of this invention in production of fertilizers wherein sulfurous acid is obtained from sulfur oxides from the burning of sulfur-containing fossil fuels and the process for phosphatic fertilizer production is carried out as described in U.S. Pat. Nos. 4,073,634, 4,168,150 and 4,252,553, all incorporated herein by reference. The phosphate rock solubilization process of the present invention provides enhanced phosphate rock solubilization by sulfurous acid in the processes described in those patents. However, sulfurous acid from any source may be utilized in the process of this invention.

The chemical reaction between an aqueous solution of sulfurous acid and phosphate rock may be conducted in a suitable heterogeneous reactor, in a ball mill, in stirred tanks, or in any other solid-liquid contacting system. Phosphate rock suitable for use in this invention is sized to provide a high surface area by grinding to small particle sizes, preferably from less than about 0.1 mm to about 5 mm, and most preferably from less than about 0.1 mm to about 1 mm. Phosphate rocks which are presently considered low grade phosphate rocks and not suitable for presently used processes for production of fertilizer may be particularly attractive for commercial use according to the enhanced phosphate solubilization process of this invention due to their low cost.

Untreated phosphate rock may be used in accordance with this invention by solubilization of phosphate with sulfurous acid in the presence of the specified oxidizers. By the term "untreated" phosphate rock, we mean phosphate rock which has not been thermally pretreated or subjected to any chemically active pretreatment. Thermally pretreated phosphate rock may also be advantageously used in this invention, but due to its already relatively high phosphate solubility, thermally pretreated phosphate rock does not provide the unexpectedly high enhancement of phosphate solubility as does untreated phosphate rock. Use of thermally pretreated phosphate rock in this invention does provide an unexpectedly high rate of phosphate solubilization. By "thermally pretreated" phosphate rock, we mean thermal pretreatment of the rock which removes its organic content and/or substantially reduces the fluorine content of the rock. Generally untreated phosphate rock contains about 3.5 weight percent fluorine while the thermally pretreated phosphate rock may contain as low as about 0.1 weight percent fluorine. Thermally pretreated phosphate rock may be obtained by methods described by VanWazer who has suggested the thermally pretreated and defluorinated phosphate compounds made from such phosphate rock treatment vary from crude alpha-tricalcium and beta-tricalcium phosphate to a mixture of condensed phosphates (heteropolyphosphates), as described in "Phosphorous and its Compounds", Vol. II, pages 1090-1092 and 1095-1097, edited by John R. VanWazer, Interscience Publishers, Inc., New York, N.Y., 1961.

Solubilization of phosphate rock may be considered to proceed generally in the following fashion expressed by the simplified chemical equations:

Solubilization by sulfurous acid:

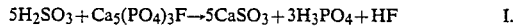
$$5H_2SO_3 + Ca_5(PO_4)_3F \rightarrow 5CaSO_3 + 3H_3PO_4 + HF \qquad \text{I.}$$

Sulfurous acid reacted with oxidant hydrogen peroxide proceeds according to Equation II in the formation of sulfuric acid:

$$H_2SO_3 + H_2O_2 \rightarrow H_2SO_4 + H_2O \qquad \text{II.}$$

Sulfuric acid readily reacts with phosphate rock according to the Equation III:

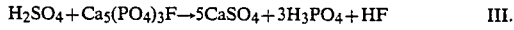
$$H_2SO_4 + Ca_5(PO_4)_3F \rightarrow 5CaSO_4 + 3H_3PO_4 + HF \qquad \text{III.}$$

Throughout this disclosure and claims, when stoichiometric amounts of a compound are referred to, they are related to the above chemical equations.

The process of this invention for solubilization of phosphate rock may be achieved by contacting phosphate rock with an aqueous solution of sulfurous acid in the presence of an oxidizing agent of hydrogen peroxide. Hydrogen peroxide is a preferred oxidizing agent for a liquid-solid phase reaction. As shown in FIG. 1, untreated phosphate rock contacted with sulfurous acid in one hour solubilizes from about 10 to about 25 percent total phosphate as $P_2O_5$. When small molar quantities of hydrogen peroxide, as compared to the stoichiometry of the above equations, is added to the sulfurous acid-phosphate rock system, the solubilization of phosphate from the phosphate rock is surprisingly enhanced with greatly substoichiometric amounts of hydrogen peroxide. As a comparative test, the use of hydrogen peroxide in the presence of sulfuric acid depresses phosphate solubilization from phosphate rock, as shown in FIG. 1 in the comparative results. The specific data for FIG. 1 are more fully set forth in Examples I and II. The process of this invention proceeds very well when the oxidizing agent is present in less than about 50 percent moles of the stoichiometric amount for reaction with sulfurous acid, and from a process and economic standpoint, the oxidizing agent is preferably present in about 3 to about 30 percent moles of the stoichiometric amount for reaction with sulfurous acid.

In the liquid-solid phase reaction with sulfurous acid, it is preferred to mix the sulfurous acid and oxidizing agent to form an aqueous solution of the mixture to which phosphate rock is added with stirring continued for about 5 to about 60 minutes. From a process and economic standpoint, it is preferred that stirring and contacting is continued for about 10 to about 30 minutes and the phosphate rock used is untreated phosphate rock. The process may be carried out at ambient temperature and pressure. By ambient temperature and pressure, we mean surrounding atmosphere, temperature and pressure and above as may be determined by the temperature and pressure of reactants obtained directly from a prior process, such as sulfurous acid obtained from sulfur oxides in flue gases. There is no need to utilize energy in the provision of heat or pressure for the purposes of this process.

While an important aspect of this invention is phosphate solubilization of untreated phosphate rock, the process may be used to greatly enhance the phosphate solubility rate from thermally pretreated phosphate rock over shorter time periods of about 5 to 30 minutes.

Reference to stoichiometric amounts of reactants is for illustrative purposes and it is readily apparent that lesser than stoichiometric amounts or greater than stoichiometric amounts of sulfurous acid may be used in the process of this invention, preferably from about the stoichiometric amount to about 25 percent in excess of the stoichiometric amount of sulfurous acid.

The mode of action of the oxidizing agent in the process of this invention is not known but it is a catalytic or synergistic or regenerative reaction system in view of the extremely substoichiometric amounts of hydrogen peroxide which are highly effective in the solubilization of phosphate using aqueous solutions of sulfurous acid.

The following Examples show specific processes and methods utilizing embodiments of this invention and are intended to be exemplary and not to limit the invention in any way.

EXAMPLE I

Aqueous solutions of mixtures of sulfurous acid ($H_2SO_3$) and hydrogen peroxide ($H_2O_2$) were prepared such that 100 ml of each solution of mixtures contained 15.7 mole percent excess $H_2SO_3$ and variable amounts of $H_2O_2$ as shown in Table 1, both based upon the stoichiometry of Equations I and II. To each 100 ml aqueous solution containing the specified amount of $H_2O_2$ and maintained at room temperature was added in one rapid addition 586.7 mg phosphate rock at room temperature. The phosphate rock used was untreated fluorapatite concentrate having a typical particle size range from 0.1 to 1.0 mm diameter and an analyzed content of 34.1 weight percent total phosphate expressed as $P_2O_5$. Each solution with the phosphate rock was stirred with a magnetic stirrer for one hour. The liquid of each solution was then analyzed for total phosphate by the Association of Florida Phosphate Chemists Standard Method for Phosphate Analysis: Molybdovanadate Spectrophotometric Method. The total phosphate measured was compared to phosphate content of the 586.7 mg of phosphate rock originally present in each solution and is shown in Table 1 as Percent Total Phosphate Solubilized expressed as $P_2O_5$.

TABLE 1

| Percent of Moles $H_2O_2$ of Stoichiometric Requirement | Percent Total Phosphate Solubilized as $P_2O_5$ |
| --- | --- |
| 0.0 | 10 to 25* |
| 3.1 | 68.6 |
| 6.3 | 78.9 |
| 12.6 | 89.8 |
| 25.2 | 94.6 |
| 50.3 | 100.0 |
| 101.0 | 100.0 |

*Results of multiple tests - dependent upon quality of sulfurous acid and uniformity of rock size.

These results are shown in FIG. 1 by the solid line and show the enhancing action of $H_2O_2$ at highly sub-stoichiometric amounts based upon the stoichiometry of Equation II when using $H_2SO_3$ for phosphate rock solubilization.

EXAMPLE II
(COMPARATIVE)

Similar analyses to those of Example I were conducted using stoiciometric amounts of $H_2O_2$ in each solution and variable amounts of sulfuric acid ($H_2SO_4$), based upon the stoichiometry of Equation III. All other conditions and procedures were the same as set forth in Example I. An additional set of analyses was performed without $H_2O_2$ in the solutions. The results are shown in Table 2.

TABLE 2

| Percent of Moles $H_2SO_4$ of Stoichiometric Requirement | Percent Total Phosphate Solubilized as $P_2O_5$ | |
| --- | --- | --- |
| | A $H_2O_2$ Present | B $H_2O_2$ Absent |
| 0 | 0.1 | 0.1 |
| 10 | 6.7 | 15.7 |
| 50 | 37.0 | 58.5 |
| 100 | 58.4 | 89.7 |

These results are shown in FIG. 1 by the dashed lines and show the depressing action of $H_2O_2$ when using $H_2SO_4$ for phosphate rock solubilization.

EXAMPLE III

Phosphate rock solubilization rate was measured at specified time periods for up to 24 hours in a series of tests using different orders of phosphate rock and $H_2O_2$ addition with $H_2SO_3$.

The first series used untreated phosphate rock as described in Example I with the amount of $H_2O_2$ used and the phosphate solubilized at various times shown in Table 3. In the first test (A) phosphate rock was added to 100 ml aqueous solution of a stoichiometric amount of $H_2SO_3$; in the second test (B) phosphate rock was added to 90 ml of an aqueous solution containing $H_2O_2$ which was stirred for about five minutes following which $H_2SO_3$ was added and the aqueous solution totaled 100 ml; in the third test (C) 100 ml of an aqueous solution of $H_2O_2$ and $H_2SO_3$ was first mixed and phosphate rock added. The remainder of the conditions and analyses were conducted as set forth in Example I. The results are shown in Table 3.

TABLE 3

| | Untreated Phosphate Rock | | | | |
| --- | --- | --- | --- | --- | --- |
| | Percent of Moles $H_2O_2$ of Stoichiometric Requirement | Percent Total Phosphate Solubilized as $P_2O_5$ Time (min) | | | |
| | | 10 | 30 | 60 | 1400 |
| Rock added to $H_2SO_3$ (A) | 0 | — | — | 15 | 16 |
| Rock added to $H_2O_2$ then $H_2SO_3$ (B) | 6.3 | 25 | 41 | 45 | 58 |
| Rock added to Mixture $H_2O_2$ and $H_2SO_3$ (C) | 6.3 | 44 | 50 | 56 | 58 |

Figure 2:
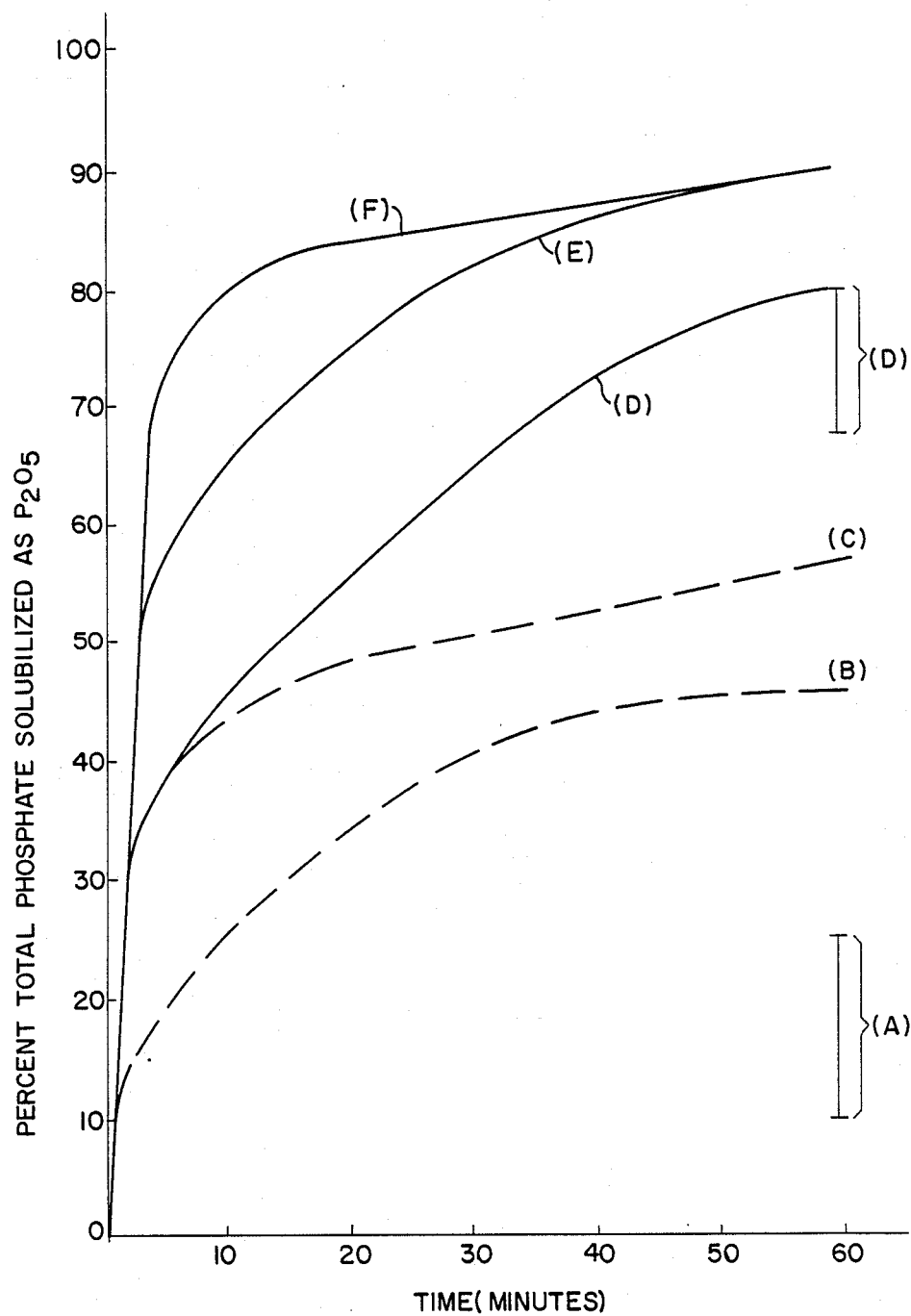
FIG. 2 shows the rate of phosphate solubilization from phosphate rock according to this invention as described in Example III.

These results are shown in FIG. 2 by the dashed lines, as identified.

A second series of tests was conducted under the same conditions except that thermally pretreated commercial feed grade defluorinated phosphate rock, Regular Grind, having a particle size of less than 2 mm diameter was substituted for the untreated phosphate rock. The remainder of the conditions were as set forth above in this Example. The results are shown in Table 4.

TABLE 4

| | Thermally Pretreated Phosphate Rock | | | | |
| --- | --- | --- | --- | --- | --- |
| | Percent of Moles $H_2O_2$ of Stoichiometric Requirement Percent $H_2O_2$ | Percent Total Phosphate Solubilized as $P_2O_5$ Time (min) | | | |
| | | 10 | 30 | 60 | 1400 |
| Rock added to $H_2SO_3$ (D) | 0 | 45 | 65 | 68–80* | 68–80* |
| Rock added to $H_2O_2$ then $H_2SO_3$ (E) | 6.3 | 65 | 83 | 90 | 90 |
| Rock added to Mixture $H_2O_2$ and $H_2SO_3$ (F) | 6.3 | 84 | 84 | 90 | 90 |

*Results of multiple tests - dependent upon quality of sulfurous acid and uniformity of rock size. These results are shown in FIG. 2 by the solid lines, as identified.

EXAMPLE IV

To ascertain possible synergism between various mixtures of $H_2SO_4$ and $H_2SO_3$ in the solubilization of phosphate rock, thermally pretreated phosphate rock as described in Example III, was mixed with 100 ml aqueous solutions of mixed $H_2SO_4$ in percent of stoichiometric requirement based upon the stoichiometry of Equation III and $H_2SO_3$ in percent of stoichiometric requirement based upon the stoichiometry of Equation I as indicated in Table 5 and the percent total phosphate solubilized measured as $P_2O_5$ after 60 minutes. All other conditions and procedures were the same as set forth in Example I. The results are shown in Table 5.

TABLE 5

| Percent of Moles of Stoichiometric Requirement | | Percent Total Phosphate Solubilized as $P_2O_5$ |
| --- | --- | --- |
| $H_2SO_3$ | $H_2SO_4$ | |
| 10 | 0 | 7 |
| 50 | 0 | 12 |
| 100 | 0 | 25 |
| 0 | 50 | 58 |
| 10 | 50 | 67 (58 + 7)* |
| 50 | 50 | 70 (58 + 12)* |

TABLE 5-continued

| Percent of Moles of Stoichiometric Requirement | | Percent Total Phosphate Solubilized as $P_2O_5$ |
| --- | --- | --- |
| $H_2SO_3$ | $H_2SO_4$ | |
| 100 | 50 | 86 (58 + 25)* |

*Shown in parenthesis are the additive effects which compare favorably with the solubility found indicating enhanced phosphate solubilization is not due to synergism effects of varying mixtures of $H_2SO_3$ and $H_2SO_4$.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for solubilization of phosphate from phosphate rock comprising contacting said rock for about 5 to 60 minutes with sulfurous acid in the presence of an oxidizing agent consisting of hydrogen peroxide, said oxidizing agent being present in less than about 50 percent moles of the stoichiometric amount for reaction with said sulfurous acid.

2. A process of claim 1 wherein said sulfurous acid is in an aqueous solution.

3. A process of claim 1 wherein said oxidizing agent is present in about 3 to about 30 percent moles of the stoichiometric amount for reaction with said sulfurous acid.

4. A process of claim 1 wherein said sulfurous acid and said oxidizing agent are mixed to form an aqueous solution to which said phosphate rock is added with stirring continued for about 5 to about 60 minutes.

5. A process of claim 4 wherein said stirring and contacting is continued for about 10 to about 30 minutes and said phosphate rock is untreated phosphate rock.

6. A process of claim 5 wherein said contacting is carried out at ambient temperature and pressure.

7. A process of claim 4 wherein said stirring and contacting is continued for about 10 to about 30 minutes and said phosphate rock is thermally pretreated phosphate rock.

8. A process of claim 7 wherein said contacting is carried out at ambient temperature and pressure.

9. A process of claim 1 wherein said sulfurous acid is present in about the stoichiometric amount to about 25 percent excess of the stoichiometric amount relative to the calcium-bound available phosphate in said phosphate rock and hydrogen peroxide is present in about 3 to about 30 percent moles of the stoichiometric amount for reaction with said sulfurous acid.

10. In a process for production of phosphate fertilizer from fluorapatite rock, the improvement comprising: solubilizing phosphate from said fluorapatite rock by contacting said fluorapatite rock for about 5 to about 60 minutes with sulfurous acid in the presence of an oxidizing agent consisting of hydrogen peroxide, said oxidizing agent being present in less than about 50 percent moles of the stoichiometric amount for reaction with said sulfurous acid.

11. In a process of claim 10 wherein said sulfurous acid is in an aqueous solution.

12. In a process of claim 10 wherein said oxidizing agent is present in about 3 to about 30 percent moles of the stoichiometric amount for reaction with said sulfurous acid.

13. In a process of claim 10 wherein said sulfurous acid and said oxidizing agent are mixed to form an aqueous solution of the mixture to which said phosphate rock is added with stirring continued for about 5 to about 60 minutes.

14. In a process of claim 13 wherein said stirring and contacting is continued for about 10 to about 30 minutes and said phosphate rock is untreated phosphate rock.

15. In a process of claim 14 wherein said contacting is carried out at ambient temperature and pressure.

16. In a process of claim 13 wherein said stirring and contacting is continued for about 10 to about 30 minutes and said phosphate rock is thermally pretreated phosphate rock.

17. In a process of claim 16 wherein said contacting is carried out at ambient temperature and pressure.

18. A process of claim 10 wherein said sulfurous acid is present in about the stoichiometric amount to about 25 percent excess of the stoichiometric amount relative to the calcium-bound available phosphate in said phosphate rock and hydrogen peroxide is present in about 3 to about 30 percent moles of the stoichiometric amount for reaction with said sulfurous acid.

* * * * *